United States Patent [19]

Egami

[11] Patent Number: 5,239,626
[45] Date of Patent: Aug. 24, 1993

[54] DISPLAY AND DRAWING CONTROL SYSTEM

[75] Inventor: Noritaka Egami, Nagasaki, Japan

[73] Assignee: Mitsubishi Denki Kabushiki Kaisha, Tokyo, Japan

[21] Appl. No.: 324,105

[22] Filed: Mar. 16, 1989

[30] Foreign Application Priority Data

Mar. 25, 1988 [JP] Japan .................... 63-69811
Jul. 22, 1988 [JP] Japan ................... 63-183001

[51] Int. Cl.$^5$ .............................................. G06F 15/40
[52] U.S. Cl. ..................... 395/164; 395/162; 340/798; 340/799
[58] Field of Search ... 364/518, 521, 519, 200 MS File, 364/900 MS File; 340/747, 750, 798, 799; 395/162, 164, 165, 166

[56] References Cited

U.S. PATENT DOCUMENTS

| | | | |
|---|---|---|---|
| Re. 31,200 | 4/1983 | Sukonick et al. | 340/724 |
| 4,591,997 | 5/1986 | Grabel | 364/519 |
| 4,769,648 | 9/1988 | Kishino et al. | 346/33 R |
| 4,800,379 | 1/1989 | Yeomans | 340/731 |
| 4,805,099 | 2/1989 | Huber | 364/300 |
| 4,839,638 | 6/1989 | Kosler et al. | 340/784 |
| 4,841,291 | 6/1989 | Swix et al. | 340/725 |
| 4,920,337 | 4/1990 | Kuo | 340/721 |

FOREIGN PATENT DOCUMENTS 62-59334 10/1987 Japan . *

Primary Examiner—Phu K. Nguyen
Attorney, Agent, or Firm—Burns, Doane, Swecker & Mathis

[57] ABSTRACT

A display and drawing control system, having a display and drawing control unit which produces screen data including characters and images and causes the screen data to be stored in a frame memory. The display and drawing control unit also operates on a display unit to display the screen data in the frame memory under control of a central processing unit. The system further includes an auxiliary memory in addition to the frame memory. The display and drawing control unit suspends the creation of screen data in the frame memory and stores other screen data in the auxiliary memory under control of the central processing unit. The system is further provided with a print data interface circuit which directly sends screen data from the auxiliary memory to a printer, thereby enhancing the operational efficiency of the system.

8 Claims, 5 Drawing Sheets

DISPLAY AND DRAWING CONTROL SYSTEM

BACKGROUND OF THE INVENTION

1. Field of the Invention

The present invention relates to a display and drawing control system which delivers the content of display on a display unit, such as a CRT unit, also to a printer.

2. Description of the Prior Art

FIG. 1 is a block diagram of the conventional display and drawing system. FIG. 1 includes a central processing unit 1 (termed CPU hereinafter), a memory 2, an interface circuit 3 (will be termed I/F circuit hereinafter) for a printer 4, a CRT controller 5, a CPU bus 6 led out of the CPU 1, a set of signal lines 7 connecting the printer 4 to the I/F circuit, a frame memory 8, a CRT display unit 10, a CRT bus 11 connecting the frame memory 8 to the CRT controller 5, a set of signal lines 12 connecting the CRT display unit 10 to the frame memory 8, and an input/output unit 14 connected to the CPU 1.

Next, the operation will be described, starting with the CRT display unit 10. Among the various frames displayed, it is assumed that the CPU 1 produces a frame m. The CPU 1 issues various commands for producing the frame m to the CRT controller 5. Then, the CRT controller 5 responds to the commands to store figures or characters in the frame memory 8. Namely, frame data which constitutes the frame m is stored in the frame memory 8. The stored frame data is read out of the frame memory 8 and displayed on the CRT display unit 10.

In applications such as factory automation (FA), the need frequently occurs to display the operational states of a plant on the CRT display unit 10 and, at the same time, to make a hardcopy of the display. For example, actual results such as production output are displayed on the CRT display unit 10 and data in the same form as on the screen is recorded on the printer 4.

In order to make a hardcopy of the frame m, the CPU 1 controls to store the data in the frame memory 8 in the same procedure as the above-mentioned case, and then the CPU 1 operates on the CRT controller 5 to transfer the contents of the frame memory 8 to the memory 2. The contents of the memory 2 are sent to the printer 4, one block at a time, so that a hardcopy of the frame m is produced.

However, in the foregoing display and drawing system, if it becomes necessary to make a hardcopy of frame m while another frame n is being monitored, the frame n must be erased to display the frame m, and after the frame m has been copied the frame n must be displayed again. Accordingly, monitoring the frame n is suspended at least for a period after the commencement of display of the frame m until the termination of copying of the contents of frame m to the memory 2. This time period is considerably long (10 seconds to 2 minutes) and can be a problem in the FA field in which a quick response is required.

Since a mass of frame data occupying the CRT bus 11 and CPU bus 6 in transferring data to the printer 4, results in an increased burden of the CRT controller 5 and CPU 1, there arises another problem of slower throughput of the whole system.

SUMMARY OF THE INVENTION

The present invention is intended to overcome the foregoing problems and its prime object is to provide a display and drawing control system which operates to produce a hardcopy of a frame different from the screen being displayed.

The invention resides in a display and drawing system comprising an auxiliary memory which is different from a frame memory, and a controller which, switches from the frame memory to the auxiliary memory when the need for making a hardcopy of a different frame arises during the transfer of a current frame data to the frame memory. The inventive controller, when a hardcopy of a different frame needs to be made during transferring the current frame data to the frame memory and displaying on the display unit, saves information related to the displayed current frame in the auxiliary memory, and stores the frame data for the hardcopy in the auxiliary memory. The CPU retrieves the different frame data from the auxiliary memory and sends it to the printer.

Moreover, performing another object of the display and drawing control system which further enhances the efficiency of the whole system, the system is provided with a print data interface (print data I/F) circuit so that the contents of the auxiliary memory are delivered directly to the printer without using the CPU bus. In this case, the print data I/F circuit is connected to the auxiliary memory through data output lines independent of the CRT bus, converts the frame data read out of the auxiliary memory, through the output lines, into print data suitable for the printer, and sends the print data directly to the printer.

DETAILED DESCRIPTION OF THE PREFERRED EMBODIMENTS

Figure 1:
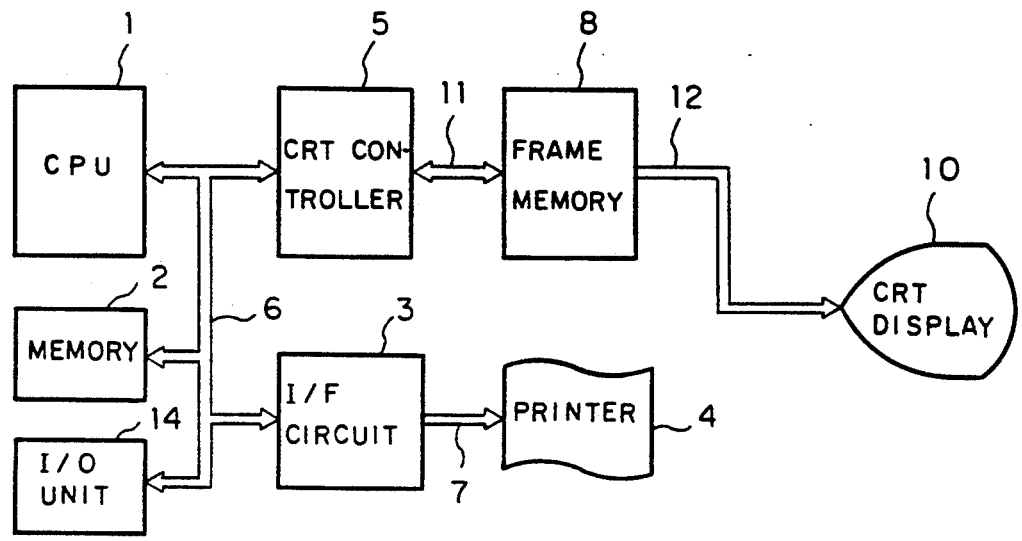
FIG. 1 is a block diagram showing a conventional display and drawing system.
Figure 2:
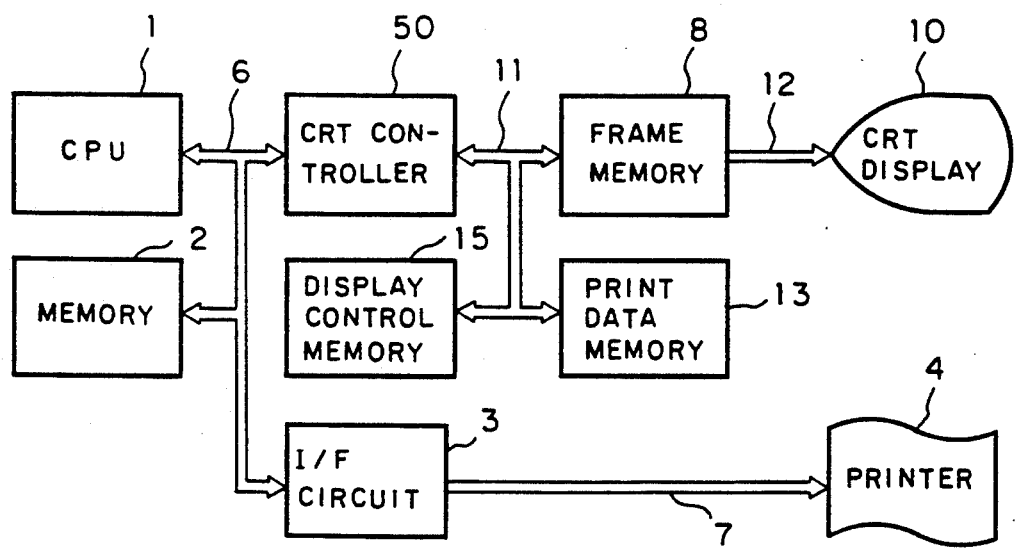
FIG. 2 is a block diagram showing a display and drawing system which is a first embodiment of this invention.

An embodiment of this invention will be described with reference to the drawings. In FIG. 2, units indicated by 1–4 and 6–12 are identical to those of the conventional system shown in FIG. 1, and includes a unit 13 which is a print data memory (an auxiliary memory) connected to a CRT controller 50. The I/O unit 14 is not shown in FIG. 2. The embodiment shown in FIG. 2 uses a CRT display unit 10 with an associated CRT controller 50, and if other type display unit than a CRT display unit is used, it will be accompanied by a corresponding controller. Display control memory 15 stores programs and data of the CRT controller 50.

Next, the operation will be described. The CRT display unit 10 displays various screen information, and its operation is identical to that of the conventional system. The following describes the operation for making a hardcopy of a frame m, while keeping another frame n displayed on the CRT display unit 10 for monitoring.

Figure 3:
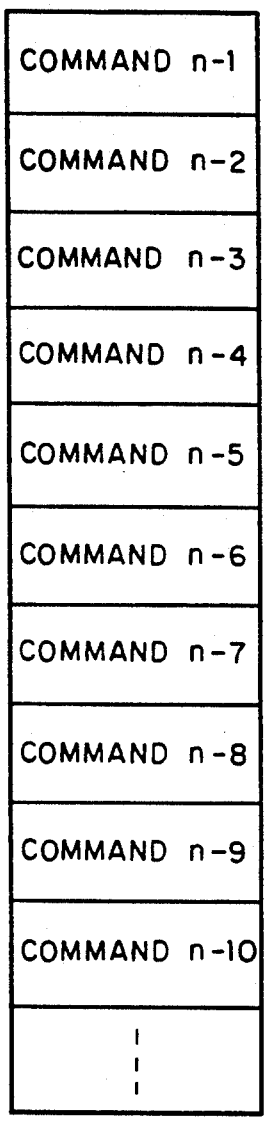
FIGS. 3 and 4 are diagrams to explain commands used in the operation of the first embodiment.

For displaying only the frame n on the CRT display unit 10, the CPU 1 issues commands n-1 through n-10 to the CRT controller 50 continuously until the screen is switched as shown in FIG. 3. In displaying the states of process, the screen information needs to respond to varying states of process. As s result, updated commands are issued successively in response to a change in the process states.

Figure 4:
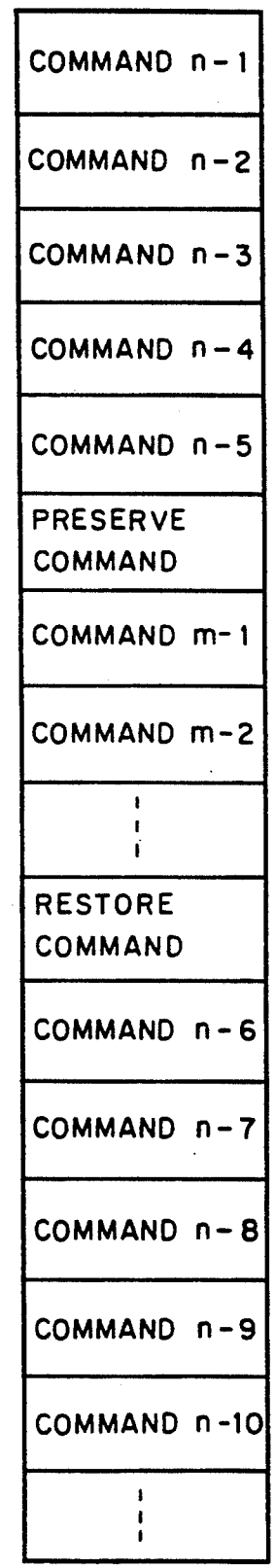

Next, when a hardcopy of the frame m is made with printer 4 and the frame n being kept displayed on the CRT display unit 10, commands are issued to the CRT controller 50 as shown in FIG. 4 (in the example of FIG. 4, the command n-5 for frame n is followed by hardcopy commands for the frame m).

The commands shown in FIG. 4 herein be described. While the frame n is displayed with the commands n-1 through n-5 for the frame n, the CPU 1 issues the preserve command to the CRT controller 50. Upon receiving the preserve command, the CRT controller 50 preserves information for the frame n, which the controller has been holding until then, (e.g., display colors, type and thickness of lines and display coordinates; these display attribute data differ with the type of CRT controller 50) into a certain area of the print data memory 13, and moves the origin of the display address from the frame memory 8 to the print data memory 13. Command m-1 and following commands successive to the preserve command are to display the frame m, and through the execution of these commands, display data for the frame m are stored in the print data memory 13.

After all the commands for the frame m have been executed, the CPU 1 sends a restore command to the CRT controller 50. In response to the restore command, the CRT controller 50 restores the preserved information for the frame n. The restore command also functions to direct the CRT controller 50 to turn back the display area from the print data memory 13 to the frame memory 8. After the restore command, the CRT controller 50 stores the data of frame n into the frame memory 8 with a command n-6 and a following. At the same time, the CPU 1 fetches the contents of the print data memory 13 and sends the data to the printer 4 for printing.

The foregoing scheme enables one to make a hardcopy of the frame m, while the frame n is kept displayed (if the data of frame m is stored in the frame memory 8, then the frame m is displayed).

Although the foregoing embodiment is the case of a CRT display unit, the same effectiveness is achieved for other type display units such as a liquid crystal display panel and a plasma display panel. The preserve command and restore command may be replaced with other means, e.g., several sub-steps of divided commands, to achieve the same effectiveness.

Figure 5:
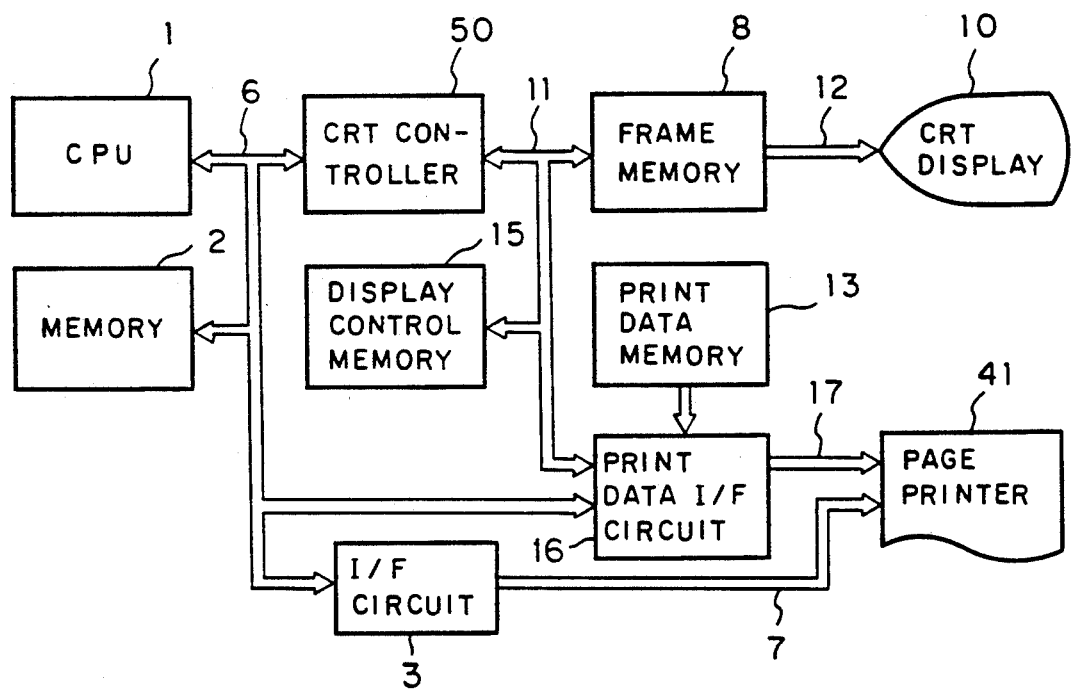
FIG. 5 is a block diagram showing a display and drawing system which is a second embodiment of this invention.

Next, the second embodiment of the invention will be described with reference to FIG. 5 and following figures. The display and drawing system of this embodiment is intended to prevent a decline in system efficiency caused by the passage of mass data within the CPU 1 and over the CPU bus 6.

FIG. 4 includes a page printer 41, an interface (I/F) circuit 3 for interfacing the commands and status data between the CPU 1 and page printer 41 so that they fit the CPU 1 and page printer 41, a print data I/F circuit 16 which converts the contents of the print data memory 13 into suitable data for the page printer, and signal lines 7 and 17 running between the display and drawing control system and the page printer 41.

Figure 6:
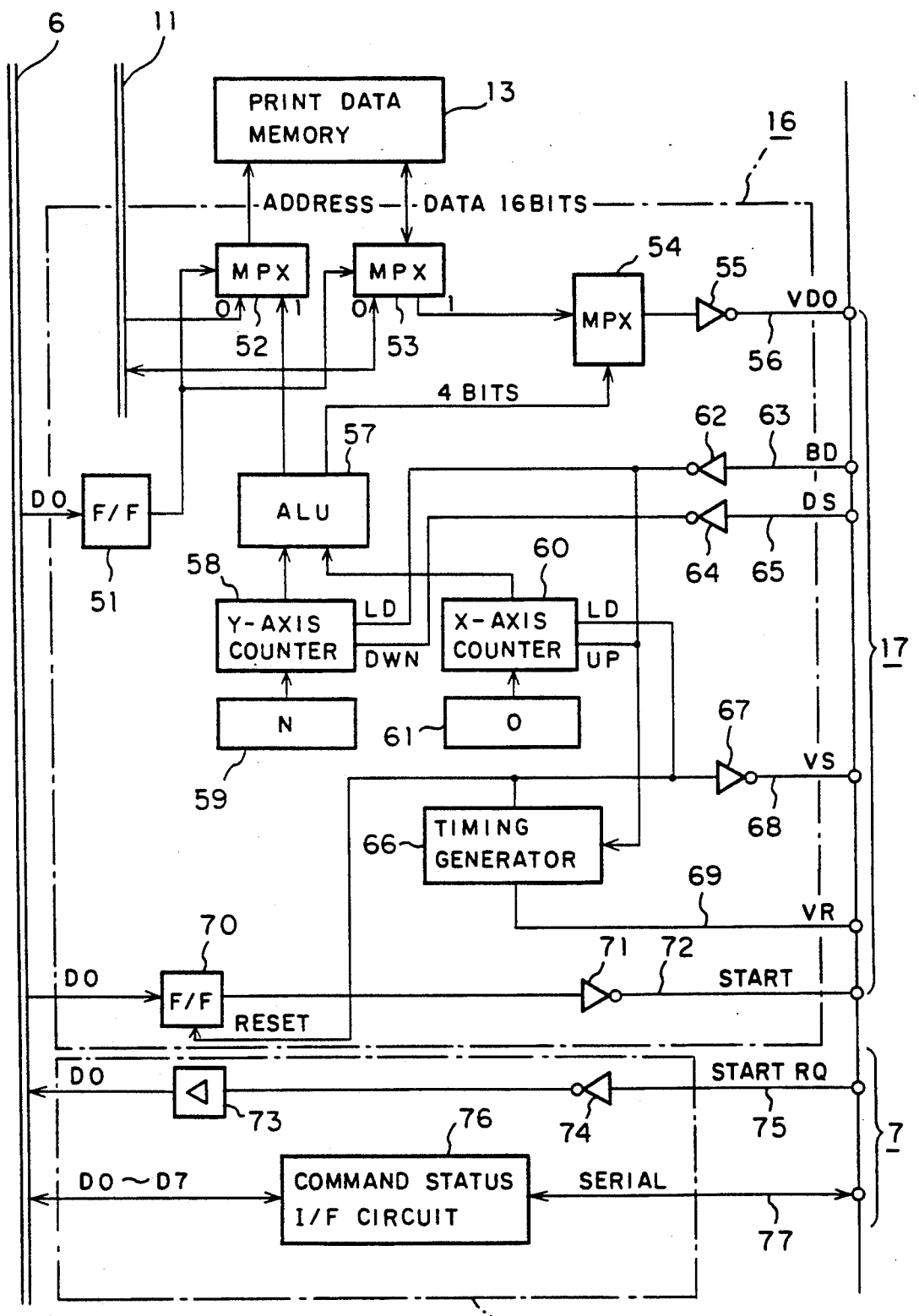
FIG. 6 is a detailed schematic diagram of the I/F circuit and the print data I/F circuit shown in FIG. 5.

FIG. 6 is a detailed schematic diagram of the I/F circuit 3 and print data I/F circuit 16, which includes a D-type flip-flop (F/F) 51, 2-to-1 multiplexers (MPX) 52 and 53, a 16-to-1 multiplexer (MPX) 54, inverter gates 55, 62, 64, 67, 71 and 74, a set-reset flip-flop (F/F) 70, a video output (VDO) signal 53, a horizontal sync input (BD) signal 63, a dot data sync input (DS) signal 65, a vertical sync output (VS) signal 68, a vertical sync request input (VR) signal 69, a print start output (START) signal 72, a start enable input (STARTRQ) signal 75, a set of command status signals 77, an arithmetic and logic unit (ALU) 57, a y-axis counter 58, an x-axis counter 60, constant generators 59 and 61, a timing generator 66, a three-state buffer 73, and a command status I/F circuit 76.

Next, the operation will be described. Initially, the CPU 1 resets the F/F 51 to output "0" and switches the MPX 52 and 53 so that the print data memory 13 is connected to the CRT bus 11. Subsequently, the CPU 1 issues a display command to the CRT controller 50, and image data for a figure corresponding to that command are stored in the frame memory 8 and print data memory 13 through the CRT bus 11. It is also possible to store the data only in the frame memory 8 or the print data memory 13.

Transfer of the contents of the print data memory 13 to the page printer 41 takes place as follows. First, the CPU 1 sends a command to the page printer 41 via the command status I/F circuit 76 to check the STARTRQ signal from the page printer 41 as to whether the page printer 41 is ready to print. If the page printer 41 is ready, the CPU 1 sets the F/F 51 to output "1", switches the MPX 52 so that the output of the ALU 57 is connected to the address lines of print data memory 13, and switches the MPX 53 so that the input of the MPX 54 is connected to the data output lines of print data memory 13.

Next, the CPU 1 sets the F/F 70 to output "1" so that the START signal 72 to the page printer 41 is turned to "ON" (="0"). The page printer 41 responds to the START signal 72 by sending back the VR signal 69, which is received by the timing generator 66, and it sends the VS signal 68 to the page printer 41 in synchronism with the BD signal 63. Since a signal at the input of the inverter gate 67 is applied to the reset input of F/F 70 and to the LD input of x-axis counter 60, the output of F/F 70 reset to "0". and the START signal is turned to "OFF" (="1"). At the same time, an output value "0" of the constant generator 61 is loaded into the counter 60. After that, in synchronism with the BD signal 63 and DS signal 65 from the page printer 41, image data are sent as VDO signals 56 from the print data memory 13 to the page printer 41.

Figure 7:
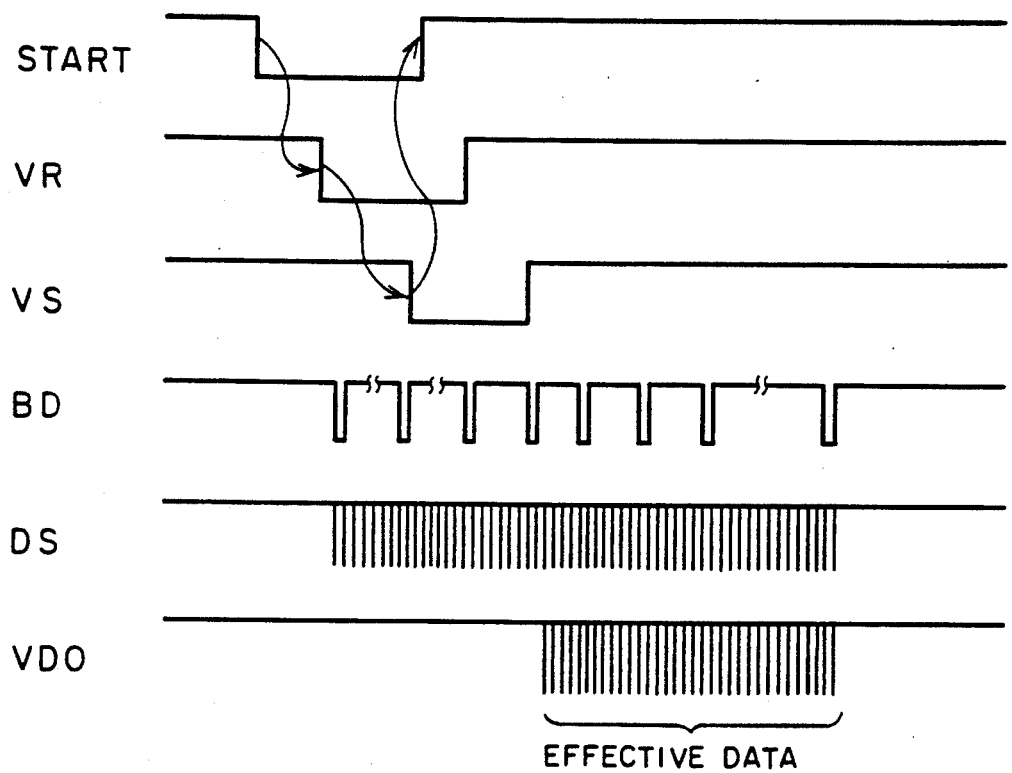
FIG. 7 is a timing chart showing the timing of signals on the signal lines 7 and 17 in FIG. 6.

The foregoing operations are shown in a timing chart of FIG. 7. The signals are polarized low-active.

Figure 8:
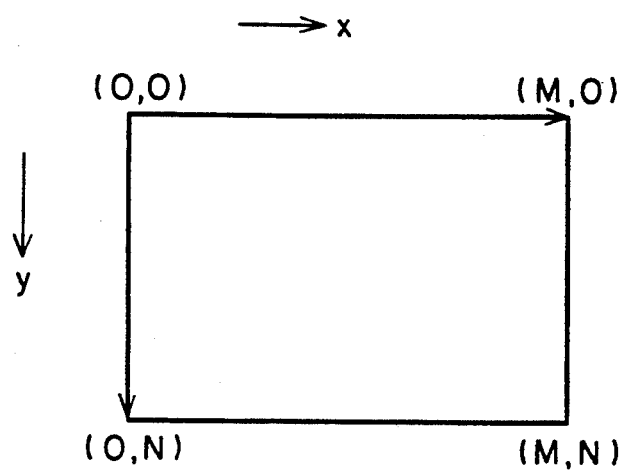
FIG. 8 is a diagram showing the coordinate system of the print area of the printer.

The operation of the image data output from the print data memory 13 will be described in more detail with reference to FIG. 8. The figure shows the print area of the page printer on the x-y coordinate system. Printing takes place in the order of the coordinates (0, N), (0, N−1), . . . , and (0, 0); here, the x-axis counter is counted up by the BD signal 63, and successively, the coordinates (1, N), (1, N−1), . . . , (1, 0); . . . ; (M, N), (M, N−1), . . . , and (M, 0). Where N is a constant of the constant generator 59, X is a count value of the x-axis counter 58, and Y is a count value of the y-axis counter 58, the ALU 57 calculates NxX+Y and outputs the calculation result to the address lines of the print data memory 13 via the MPX 52. The print data memory 13 provides the MPX 53 with data of the address specified by the value on the address lines. Since the MPX 53 is switched to send the data to the input of the MPX 54, it is eventually applied to the MPX 54, which implements 16-to-1 conversion of the data into serial data to produce the VDO signal.

Although in the foregoing embodiment the printer is a page printer 41 and the print data I/F circuit deals with a video signal, the printer may be of other type provided that it can directly print the contents of print data memory 13, and the I/F circuit may be of other type besides the video interface to achieve the same effectiveness.

Although the foregoing embodiment employs a CRT display unit 10, other display unit such as a liquid crystal display panel or plasma display panel can equally be used.

What is claimed is:

1. A display and drawing control system comprising:
a central processing unit for consecutively issuing a plurality of commands for displaying and drawing a first frame;
a frame memory for storing first screen data relating to said first frame, and for outputting the stored first screen data to a display means;
auxiliary memory means for preserving information about said first screen data stored in said frame memory, and for storing second screen data relating to a second frame, said second screen data being independent of said first screen data;
display and drawing control means, connected through a CPU bus to said central processing unit and connected through a drawing bus to both said frame memory and said auxiliary memory means, for storing in said frame memory said first screen data which said control means produces in accordance with said commands for display and drawing supplied through the CPU bus from said central processing unit, for preserving said information about said first screen data in said auxiliary memory means upon reception of a preserve command being supplied from said central processing unit, and for storing in said auxiliary memory means said second screen data which said control means produces in accordance with commands for displaying and drawing said second frame received after said preserve command from said central processing unit; and a printer interface circuit connected to said CPU bus and to a printer device, for outputting said second screen data which said display and drawing control unit reads out from said auxiliary memory means and delivers to said central processing unit and then said central processing unit sends to said printer interface circuit, whereby said display and drawing control system can output said second screen data to said printer device independently from said first screen data.

2. A display and drawing control system claimed in claim 1, further comprising:
a second printer interface circuit provided between said drawing bus and said auxiliary memory means, and connected to said CPU bus and said printer device, for connecting said drawing bus to address lines and data lines of said auxiliary memory means in response to an instruction from said central processing unit if said display and drawing control means writes said second screen data in said auxiliary memory means, and for connecting said data lines of the auxiliary memory means to said display device if said second screen data written onto said auxiliary memory means are output to said printer device,
whereby said screen data of another frame within said auxiliary memory means can be output to said display device without using said CPU bus.

3. A display and drawing control system claimed in claim 1 or 2, wherein
said display and drawing control means restores said information about said first screen data which is preserved in said auxiliary memory means upon reception of a restore command issued by said central processing unit, and returns a write destination for producing screen data from said auxiliary memory means to said frame memory.

4. A display and control system according to claim 3, wherein said auxiliary memory means and said frame memory means are of the same type of memory elements.

5. A display and drawing control system according to claim 4, wherein said display unit comprises a cathode ray tube.

6. A display and drawing control system according to claim 4, wherein said display unit comprises a plasma display panel.

7. A display and drawing control system according to claim 4, wherein said display unit comprises a liquid crystal display panel.

8. A display and drawing control system according to claim 4, wherein said printer comprises a page printer.

* * * * *